March 15, 1966  S. KARBOWNICZEK  3,240,355
HYDRAULIC DEVICE

Filed Oct. 21, 1963  2 Sheets-Sheet 1

INVENTOR.
Stanley Karbowniczek
BY Edward F. Jurow
Atty.

March 15, 1966     S. KARBOWNICZEK     3,240,355
HYDRAULIC DEVICE

Filed Oct. 21, 1963     2 Sheets-Sheet 2

INVENTOR.
Stanley Karbowniczek
BY
Atty.

United States Patent Office 3,240,355
Patented Mar. 15, 1966

3,240,355
HYDRAULIC DEVICE
Stanley Karbowniczek, Chicago, Ill., assignor to Ellis Fluid Dynamics Corporation, Chicago, Ill., a corporation of Illinois
Filed Oct. 21, 1963, Ser. No. 317,459
27 Claims. (Cl. 213—43)

This invention relates generally to a hydraulic device and it has particular relation to a hydraulic shock absorbing unit suitable for railroad draft gear purposes.

It is an important object of the present invention to provide new and improved hydraulic shock absorbing units having maximum efficiency while being limited in length and diameter for use in draft gears which are to be mounted in railroad car draft gear pockets of standardized lengths.

Another important object of the present invention is to provide a new and improved relief valve for the foregoing hydraulic shock absorbing units which will bypass hydraulic pressures in excess of the design pressures so that in effect the hydraulic shock absorbing units cannot be overloaded. The novel relief valve arrangement according to the invention is of an efficient, compact and inexpensive construction.

Other objects of this invention will, in part, be obvious and will in part appear hereinafter.

This invention is disclosed in the embodiment thereof shown in the accompanying drawings and it comprises the features of construction, combination of elements and arrangement of parts which will be exemplified in the construction hereinafter set forth and the scope of the application as indicated in the appended claims.

For a more complete understanding of the nature and scope of this invention reference can be had to the following detailed description taken together with the accompanying drawings in which.

Figure 1:
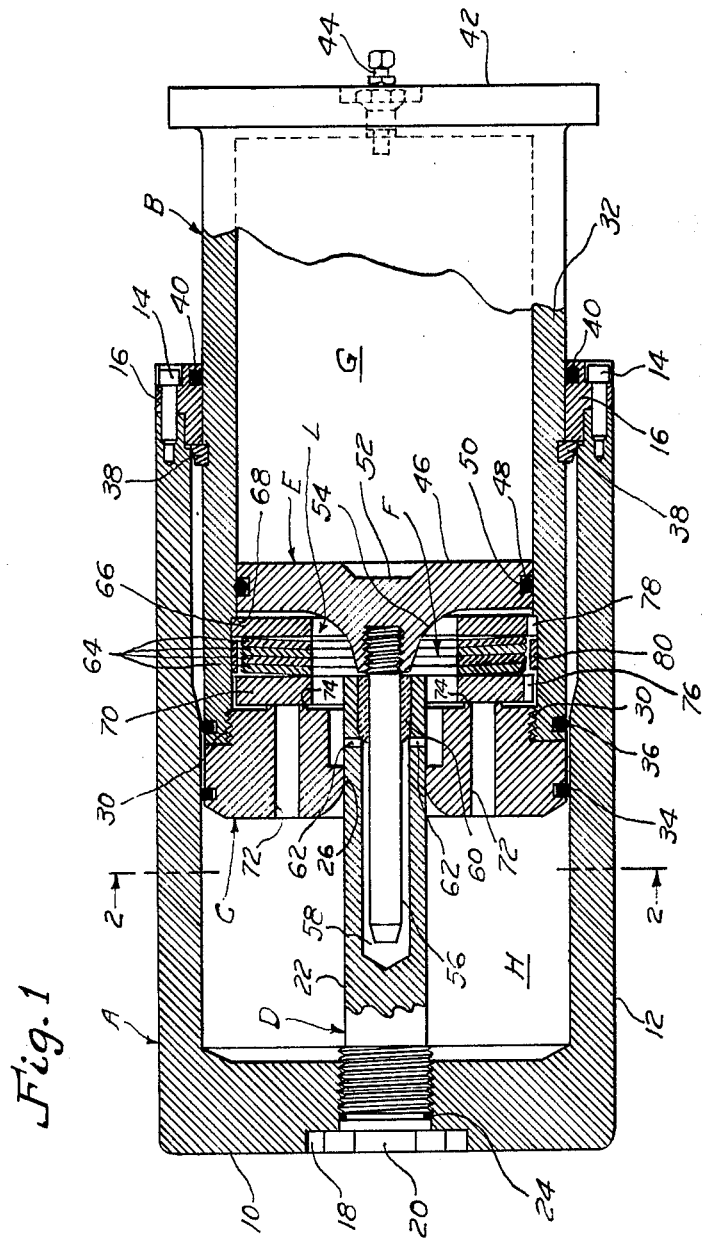
FIGURE 1 is a cross sectional view taken generally along a plane diametrically extending through the shock absorber.

The hydraulic shock absorbing unit shown in FIGURE 1 comprises in general a cylinder A having a closed end and an open end in which a ram assembly B is telescopically slidable. A piston or piston head C is attached to the inner end of the ram assembly B and has a central opening through which extends a metering pin D which is fixed to the closed end of the cylinder A. An accumulator piston E floats within the ram assembly B and is acted upon on the one hand by pressurized gas provided in a gas chamber G in the outer end of the ram assembly B and on the other hand by hydraulic fluid contained within the cylinder A. The hydraulic fluid normally passes from a high pressure chamber H in the cylinder A into a low pressure chamber L in the inner end of the ram assembly B by means of metering or orifice passages defined by the metering pin D and the central opening in the piston C but when predetermined high pressures are exceeded in the high pressure chamber H such fluid may be bypassed into the low pressure chamber L through relief passages provided in the piston C and controlled by a pressure regulating or relief valve F.

The cylinder A is characterized by a tubular side wall 12 with the closed end thereof being provided with an end wall 10 which may or may not be integral. An annular gland 16 is secured to the opposite end edge of the tubular side wall 12 at the open end of the cylinder A by a series of cap screws 14.

A headed end 20 of the metering pin D is accommodated in a recess 18 provided in the outer face of the end wall 10 of the cylinder A. The metering pin D is threaded through such end wall 10 and extends centrally axially through the cylinder A and is provided with a generally cylindrical outer surface 22. To minimize leakage of hydraulic fluid, an O-ring 24 is disposed between the mounted end of the metering pin D and the opening within which such pin fits in the end wall 10. The metering pin D extends through a central orifice opening 26 in the piston head C and is in snug sliding engagement with the inner peripheral surface of such orifice opening. Such snug sliding engagement gives added stability or lateral support to what normally would be the free end of the metering pin D and thus tends to eliminate vibration and chatter which an unsupported pin would exhibit during movement of the piston C relative thereto. As can be more readily seen from reference to FIGURES 2 and 3, the inwardly projecting portion of the metering pin D is generally cylindrical, as indicated by the surface 22, but it is provided with a pair of diametrically opposite tapering flat surfaces 28. The surfaces 28 and the inner peripheral surface of the orifice opening 26 define a pair of orifice or metering passages which provide a gradual metering of the hydraulic fluid from the high pressure chamber H to the low pressure chamber L upon inward movement of the ram assembly B into the cylinder A.

The ram assembly B is characterized by a cylindrical or tubular side wall member 32 with the piston C being threadedly mounted on the inner end thereof, as at 30. To minimize leakage of hydraulic fluid from the high pressure chamber H in the cylinder A past the ram assembly B, a cast iron automotive-type piston ring 34 is provided in a groove formed on the outer periphery of the piston C and slides against the inner surface of the tubular side wall 12 of the cylinder A. Similarly an O-ring 36 is provided in a groove formed on the outer periphery of the side wall 32 of the ram assembly B at the inner end thereof. The side wall 32 is also provided on its outer periphery and intermediate its ends with a stop ring 38 which abuts against a portion of the gland 16 to provide a positive stop for outward extension of the ram assembly B away from the cylinder A. A wiper 40 is provided in a groove formed on the inner surface of the gland 16 to minimize leakage of any hydraulic fluid which might get past the piston ring 34 and the O-ring 36. The outer end of the side wall 32 of the ram assembly B is integral with an end wall or cap 42 which is provided in the center thereof with a conventional gas valve 44 permitting charging of the gas chamber G of the ram assembly B with pressurized gas, preferably an inert gas such as nitrogen.

The pressurized gas in the chamber G serves as a resilent spring for normally maintaining the floating accumulator piston E in its innermost position and thus the ram assembly B in its fully extending position. The accumulator piston E consists of a circular disc-like member 46 having a circumferential recess or groove 48 on its outer periphery for accommodating an O-ring 50 to serve as a seal and prevent gas from escaping from the gas chamber G into the low pressure chamber L and to prevent hydraulic fluid from leaking into the gas chamber G from the low pressure chamber L. The outer face of the member 46 is provided with a centrally located recess 52 so that upon full outward movement of the accumulator piston E toward the end cap 42, any inwardly projecting portion of the gas valve 44 will be accommodated in such recess 52 and not damaged. The inner face of the member 46 is provided with a conically curved concave surface 54 which is adapted to minimize any unbalancing forces which might be directed against the accumulator piston E when high velocity hydraulic fluid jets are directed thereagainst from the orifice passages defined by the flats 28 on the metering pin D as hydraulic fluid is metered into the low pressure chamber L from the high pressure chamber H.

A guide pin or rod 56 of cylindrical configuration is secured to the inner face of the accumulator piston E and extends axially therefrom toward the piston C and into telescopic relationship in an axial bore 58 provided in the free end of the metering pin D. The guide rod 56 is supported in the bore 58 of the metering pin D by a friction-free bushing 60 which is located at the outer end of the bore 58. The pin D similarly has lateral openings 62 which are disposed inwardly of the bushing 60 and which extend between the outer periphery thereof and the bore 58 whereby to provide equalization of pressures between the bore 58 of the metering pin D and the low pressure chamber L.

Thus it will be seen that the accumulator piston E which, because it is realtively thin in respect to its diameter, would normally have a tendency to cock or cant and thus become stuck and not easily movable within the ram assembly B is stabilized to present canting thereof by the guide rod 56. Normally an accumulator piston not to have such canting characteristics would have to be made with a peripheral thickness which is equal to or not less than 70% of its diameter. However, the guide pin 56 being rigidly connected to the accumulator piston E stabilizes such piston so that it cannot cock from side to side and bind in the bore of the ram assembly B. This novel structural arrangement obviously reduces the longitudinal dimension or thickness necessary for the accumulator piston E and permits appreciable shortening of the over-all length of the shock absorber.

Figure 2:
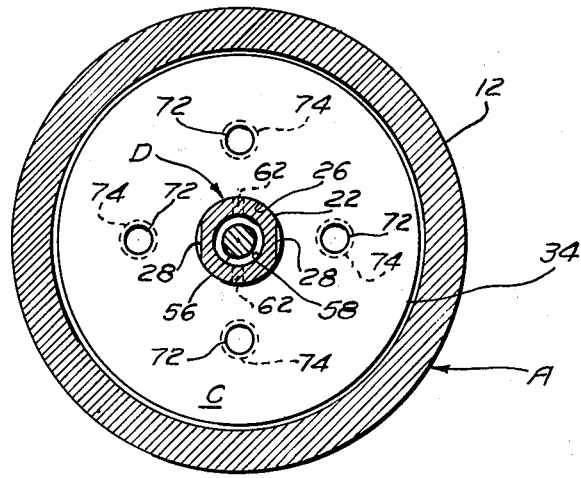
FIGURE 2 is an end cross sectional view taken generally along the section line 2—2 of FIGURE 1.
Figure 3:
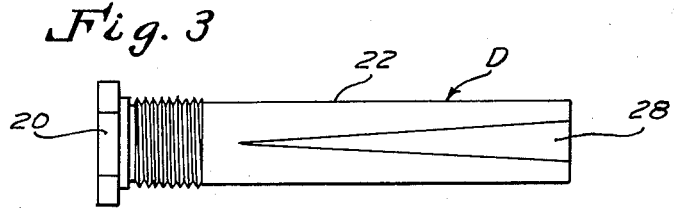
FIGURE 3 is an elevational view of the metering pin of FIGURE 1.
Figure 4:
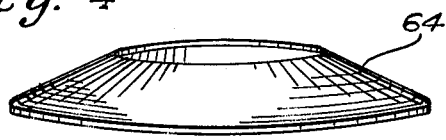
FIGURE 4 is an enlarged scale perspective or isometric view of a conical spring washer employed in the relief valve mechanism shown in FIGURE 1.

The relief valve F bypasses hydraulic fluid from the high pressure chamber H to the low pressure chamber L when a pressure is developed in the high pressure chamber H in excess of the designed pressure for the unit. In this fashion the hydraulic shock absorber is protected and cannot be overloaded. The relief valve F consists of a series of conical spring washers 64, four being shown in section in FIGURE 1 and a perspective or isometric view of one being shown in FIGURE 4. These conical spring washers 64 are commonly known as Belleville washers. The conical springs 64 are precompressed in stacked face-to-face relationship between a backup plate 66 disposed in abutting engagement with a shoulder 68 provided interiorly of the side wall 32 of the ram assembly B and a valve plate 70 which is normally biased into engagement with the inner face of the piston C by the springs 64. Precompression of the conical spring washers 64 is achieved during assembly when the piston C is threaded along the threads 30 into the inner end of the ram assembly B. The valve plate 70 is thus held under stress against the inner face of the piston C and closes off the inner ends of one or more bypass or relief passages 72 which extend longitudinally through the piston C. As best shown in FIGURE 2, the embodiment of the invention illustrated in the drawings utilizes four circumferentially spaced relief passages 72. The relief passages 72 are normally closed by the valve plate 70 until such time as the effective hydraulic pressure of the high pressure chamber H acting against the valve plate 70 exceeds the pressure required to deflect the conical springs 64 at which time hydraulic fluid will be bypassed through the relief passages 72 from the high pressure chamber H into the low pressure chamber L.

It has been found that the use of a stack or multiple number of conical spring washers 64 provides a damping action to the compression and decompression thereof. Thus, intermittent opening and closing or chattering of the relief valve F is effectively suppressed. Additionally, the opening characteristic of the relief valve F is much more easily controllable and is less influenced by transient hydraulic phenomena.

The valve plate 70 as well as the backup plate 66 are each in the form of a disc-like member having a central opening and are of hardened metal. The face of the valve plate 70 adjacent the piston C is ground to a very smooth surface for engagement with a series of bosses 74 provided on the inner face of the piston C, one each of which surrounds the inner end of each of the relief passages 72. The annular sealing area of the bosses 74 is maintained as small as possible consistent with good engineering practice to eliminate the possibility of hydraulic pressure creeping between the surfaces and thus opening the relief valve F prematurely. The bosses 74 as well as the valve plate 70 are of hardened steel so that indenting of one or the other will not occur. As a precautionary measure to prevent hydraulic fluid being trapped between the inner face of the piston C on which the bosses 74 are located and the valve plate 70, the valve plate is provided with edge slots 76. Similar edge slots 78 are provided in the backup plate 66 in the event trapped hydraulic fluid is encountered. It will be noted that opening movement of the valve plate 70 is limited by the provision of a valve plate stop in the form of a circular ring 80 which is disposed between the backup plate 66 and the valve plate 70 along the interior surface of the side wall 32 of the ram assembly B.

With approximately 150 pounds per square inch gas pressure in the gas chamber G and no external force applied to the ram assembly B, the shock absorber will be in its normal extended or elongated position, as shown in FIGURE 1. The accumulator piston E will be to the extreme left, as viewed in FIGURE 1, and substantially all of the hydraulic fluid will be within the high pressure chamber H. There will be some hydraulic fluid in the low pressure chamber L which is partially occupied by the relief valve F. Upon the application of an impact force to the end cap 42 of the ram assembly B, the ram assembly will travel toward the left in FIGURE 1 forcing the hydraulic fluid from the high pressure chamber H through the orifice passages defined by the flats 28 on the metering pin D into the low pressure chamber L. The latter hydraulic fluid will force the accumulator piston E to the right, further compressing the gas in the gas chamber G. This procedure continues until maximum design pressure is reached which will be at some time prior to bottoming of the piston C against the end wall 10 of the cylinder A. Should maximum design pressure be reached, the valve plate 70 will be unseated from its sealing engagement with the bosses 74 and permit the high pressure hydraulic fluid in the chamber H to flow through the bypass or relief passages 72 into the low pressure chamber L. Controlled and protected closure or travel of the ram assembly B into the cylinder A will thus be achieved.

Since certain changes may be made in the foregoing construction and different embodiments of the invention may be made without departing from the spirit and scope thereof, it is intended that all matter shown in the accompanying drawings and described herebefore shall be interpreted as illustrative and not in a limiting sense.

What is claimed as new is:

1. A hydraulic shock absorbing unit comprising, in combination, a cylinder having one end closed by an end wall, a cylindrical ram assembly telescopically mounted in the opposite open end of said cylinder for relative movement therein and having its outer end provided with a closure, a piston mounted on the inner end of said ram assembly and having a central cylindrical opening formed therein, a generally cylindrical metering pin having one end mounted in the center of said end wall and projecting inwardly of said cylinder and through said central opening in said piston in a manner such that the projecting portion of said metering pin is laterally supported in said piston during longitudinal movement of said piston relative thereto, means on said metering pin defining with said piston opening orifice means between opposite faces of said piston, means defining an axial bore in said projecting end of said metering pin, an accumulator piston floatingly mounted in said ram assembly and biased toward said piston by a charge of compressed gas in a gas chamber defined in said ram assembly between said accumulator piston and said ram assembly end closure, a guide pin mounted in the center of the face of said accumulator piston adjacent said piston and projecting into said axial bore formed in said metering pin to stabilize said accumulator piston and prevent canting thereof in said ram assembly, the inner portion of said cylinder defined between said end wall and the outer face of said piston providing a high pressure hydraulic fluid chamber and the inner portion of said ram assembly defined between the inner face of said piston and the adjacent face of said accumulator piston providing a low pressure hydraulic fluid chamber, and pressure regulating valve means for bypassing said orifice means upon the development of a predeterimned high pressure in said high pressure chamber.

2. A hydraulic shock absorbing unit as recited in claim 1 wherein the outer surface of said metering pin is provided with a series of longitudinally extending flats which define with said piston opening orifice means between said outer and inner faces of said piston.

3. A hydraulic shock absorbing unit as recited in claim 1 wherein the peripheral edge of said accumulator piston is relatively thin with respect to its diameter.

4. A hydraulic shock absorbing unit as recited in claim 1 wherein the longitudinal dimension of said accumulator piston at its outer periphery is less than 70% of its diameter.

5. A hydraulic shock absorbing unit as recited in claim 1 wherein the face of said accumulator piston adjacent said piston is characterized by a portion disposed radially outwardly of said guide pin which is conically and concavely curved whereby any high velocity hydraulic fluid jets directed thereagainst from said orifice means will not tend to cant said accumulator piston in said ram assembly.

6. A hydraulic shock absorbing unit as recited in claim 1 wherein said ram assembly end closure is provided with a gas valve for charging said gas chamber with gas under pressure.

7. A hydraulic shock absorbing unit as recited in claim 1 wherein a series of circumferentially spaced passages are provided in said piston between said inner and outer faces thereof, and wherein said pressure regulating valve means comprises a valve plate which is seatable against the inner face of said piston for normally closing the inner ends of said passages, and means biasing said valve plate against said inner face of said piston to close said passages until a predetermined high pressure is developed in said high pressure chamber whereupon said valve plate is movable away from said inner face of said piston to open said passages in said piston between said high and low pressure chambers.

8. A hydraulic shock absorbing unit as recited in claim 7 wherein said biasing means of said pressure regulating valve means comprises a series of precompressed conical spring washers which are retained against said valve plate by a backup plate which is seated against a shoulder provided in said ram assembly.

9. A hydraulic shock absorbing unit as recited in claim 7 wherein the inner face of said piston is provided about the inner end of each of said passages with an annular boss, said bosses having finished surfaces against which said valve plate is seated.

10. A hydraulic shock absorbing unit comprising, in combination, a cylinder having one end closed by an end wall, a cylindrical ram assembly telescopically mounted in the opposite open end of said cylinder for relative movement therein and having its outer end provided with a closure, a piston mounted on the inner end of said ram assembly and having a central opening formed therein, an elongated metering pin having one end mounted in the center of said end wall and projecting inwardly of said cylinder and through said central opening in said piston, said metering pin and said piston opening defining orifice means between opposite faces of said piston, means defining an axial bore in said projecting end of said metering pin, an accumulator piston floatingly mounted in said ram assembly and biased toward said piston by a charge of compressed gas in a gas chamber defined in said ram assembly between said accumulator piston and said ram assembly end closure, a guide pin mounted in the center of the face of said accumulator piston adjacent said piston and projecting into said axial bore formed in said metering pin to stabilize said accumulator piston and prevent canting thereof in said ram assembly, the inner portion of said cylinder defined between said end wall and the outer face of said piston providing a high pressure hydraulic fluid chamber and the inner portion of said ram assembly defined between the inner face of said piston and the adjacent face of said accumulator piston providing a low pressure hydraulic fluid chamber, one or more passage means formed in said piston between said inner and outer faces thereof, a valve plate seatable against the inner face of said piston for normally closing the inner end of said passage means, and meas biasing said valve plate against said inner face of said piston to close said passage means until a predetermined high pressure is developed in said high pressure chamber whereupon said valve plate is movable away from said inner face of said piston to open said passage means in said piston between said high and low pressure chambers.

11. A hydraulic shock absorbing unit as recited in claim 10 wherein said valve plate biasing means comprises a stacked series of precompressed conical spring washers which are retained against said valve plate by a backup plate which is seated against a shoulder provided in said ram assembly.

12. A hydraulic shock absorbing unit as recited in claim 10 wherein said central piston opening is cylindrical and said metering pin is generally cylindrical with the diameters thereof being approximately the same whereby said inwardly projecting end of said metering pin is laterally supported in said central piston opening during relative movement therebetween.

13. A hydraulic shock absorbing unit as recited in claim 10 wherein the peripheral edge of said accumulator piston is relatively thin with respect to its diameter.

14. A hydraulic shock absorbing unit comprising, in combination, a cylinder having one end closed by an end wall, a cylindrical ram assembly telescopically mounted in the opposite open end of said cylinder for relative movement therein and having its outer end provided with a closure, a piston mounted on the inner end of said ram assembly and having a central cylindrical opening formed therein, a generally cylindrical elongated metering pin having one end mounted in the center of said end wall and projecting inwardly of said cylinder and through said central opening in said piston in a manner such that the projecting portion of said metering pin is laterally supported in said piston during longitudinal movement of said piston relative thereto, means on said metering pin defining with said piston opening orifice means between opposite faces of said piston, an accumulator piston floatingly mounted in said ram assembly and biased toward said piston by a charge of compressed gas in a gas chamber defined in said ram assembly between said accumulator piston and said ram assembly end closure, the inner portion of said cylinder defined between said end wall and the outer face of said piston providing a high pressure hydraulic fluid chamber and the inner portion of said ram assembly defined between the inner face of said piston and the adjacent face of said accumulator piston providing a low pressure hydraulic fluid chamber, a series of circumferentially spaced passages formed in said piston between said inner and outer faces thereof, a valve plate seatable against the inner face of said piston for normally closing the inner end of said passages, and means normally biasing said valve plate against said inner face of said piston to close said passages until a predetermined high pressure is developed in said high pressure chamber whereupon said valve plate is movable away from said inner face of said piston to open said passages in said piston between said high and low pressure chambers.

15. A hydraulic shock absorbing unit as recited in claim 14 wherein the outer surface of said metering pin is provided with a series of longitudinally extending flats which define with said piston opening orifice means between said high and low pressure chambers.

16. A hydraulic shock absorbing unit as recited in claim 14 wherein the face of said accumulator piston adjacent said piston is characterized by a generally central position which is conically and concavely curved whereby any high velocity hydraulic fluid jets directed thereagainst from said orifice means will not tend to cant said accumulator piston in said ram assembly.

17. A hydraulic shock absorbing unit as recited in claim 14 wherein said valve plate biasing means comprises a stack of precompressed conical spring washers which are retained against said valve plate by a backup plate seated against a shoulder formed in said ram assembly.

18. A hydraulic shock absorbing unit comprising, in combination, a cylinder having one end closed by an end wall, a cylindrical ram assembly telescopically mounted in the opposite open end of said cylinder for relative movement therein and having its outer end provided with a closure, a piston mounted on the inner end of said ram assembly, an accumulator piston floatingly mounted in said ram assembly and biased toward said piston by a charge of compressed gas in a gas chamber defined in said ram assembly between said accumulator piston and said ram assembly end closure, the inner portion of said cylinder defined between said end wall and the outer face of said piston providing a high pressure hydraulic fluid chamber and the inner portion of said ram assembly defined between the inner face of said piston and the adjacent face of said accumulator piston providing a low pressure hydraulic fluid chamber, and pressure regulating valve means in said piston for providing communication between said high and low pressure chambers upon the development of a predetermined high pressure in said high pressure chamber during closure of said unit and inward movement of said piston.

19. A hydraulic shock absorbing unit comprising, in combination, a cylinder having one end closed by an end wall, a cylindrical ram assembly telescopically mounted in the opposite open end of said cylinder for relative movement therein and having its outer end provided with a closure, a piston mounted on the inner end of said ram assembly, an accumulator piston floatingly mounted in said ram assembly and biased toward said piston by a charge of compressed gas in a gas chamber defined in said ram assembly between said accumulator piston and said ram assembly end closure, the inner portion of said cylinder defined between said end wall and the outer face of said piston providing a high pressure hydraulic fluid chamber and the inner portion of said ram assembly defined between the inner face of said piston and the adjacent face of said accumulator piston providing a low pressure hydraulic fluid chamber, a series of circumferentially spaced passages formed in said piston between said inner and outer faces thereof, a valve plate seatable against the inner face of said piston for normally completely closing the inner ends of said passages, spring means biasing said valve plate against said inner face of said piston to close said passages until a predetermined high pressure is developed in said high pressure chamber during closure of said unit whereupon said valve plate is movable away from said inner face of said piston to open said passages in said piston between said high and low pressure chambers until said predetermined pressure in said high pressure chamber is relieved, and separate passage means for returning fluid to said high pressure chamber from said low pressure chamber during expansion of said unit.

20. A hydraulic shock absorbing unit as recited in claim 19 wherein said valve plate biasing means comprises a series of precompressed conical spring washers retained against said valve plate by shoulder means associated with said ram assembly.

21. A hydraulic shock absorbing unit comprising, in combination, a cylinder having one end closed by an end wall, a cylindrical ram assembly telescopically mounted in the opposite open end of said cylinder for relative movement therein and having its outer end provided with a closure, a piston mounted on the inner end of said ram assembly, the inner portion of said cylinder defined between said end wall and the outer face of said piston providing a high pressure hydraulic fluid chamber with a low pressure hydraulic fluid chamber being provided adjacent the inner face of said piston, a series of circumferentially spaced passaged formed in said piston between said inner and outer faces thereof, a valve plate seatable against the inner face of said piston for normally completely closing the inner end of said passages, spring means normally biasing said valve plate against said inner face of said piston to close said passages until a predetermined high pressure is developed in said high pressure chamber during closure of said unit whereupon said valve plate is movable away from said inner face of said piston to open said passages in said piston between said high and low pressure chambers until said predetermined pressure in said high pressure chamber is relieved, and separate passage means for returning fluid to said high pressure chamber from said low pressure chamber during expansion of said unit.

22. A hydraulic shock absorbing unit as recited in claim 21 wherein said valve plate biasing means comprises a stacked series of precompressed conical spring washers which are retained against said valve plate by shoulder means associated with said ram assembly.

23. A hydraulic shock absorbing unit as recited in claim 22 wherein the inner face of said piston means is provided about the inner end of each of said passages with an annular boss, said bosses having finished surfaces against which said valve plate is seated.

24. A hydraulic device comprising, in combination, a cylinder, piston means movable in said cylinder with high and low pressure fluid chambers being disposed on opposite sides thereof, a series of circumferentially spaced relief passages formed in said piston means and extending between the opposite faces thereof, a valve plate seatable against the low pressure face of said piston means for normally completely closing said relief passages, and means normally biasing said valve plate against said low pressure face of said piston means to close said relief passages until a predetermined high pressure is developed in said high pressure chamber during closure of said device whereupon said valve plate is movable away from said low pressure face of said piston means to open said relief passages in said piston means between said high and low pressure chambers, thereby providing a pressure regulating valve for said hydraulic device.

25. A hydraulic device as recited in claim 24 wherein said valve plate biasing means comprises a series of precompressed conical spring washers which are retained against said valve plate in stacked relationship.

26. A hydraulic device as recited in claim 25 wherein said series of precompressed conical spring washers are stacked in face-to-face relationship.

27. A hydraulic device as recited in claim 24 wherein said low pressure face of said piston means is provided about the inner end of each of said passages with an annular boss, said bosses having finished surfaces against which said valve plate is seated.

References Cited by the Examiner
UNITED STATES PATENTS

| | | | |
|---|---|---|---|
| 12,849 | 5/1855 | Adams | 213—40 |
| 1,178,688 | 4/1916 | Stronach. | |
| 1,744,514 | 1/1930 | Thompson | 188—8 |
| 1,772,830 | 8/1930 | Hankins | 213—30 |
| 1,783,348 | 12/1930 | Taylor | 188—103 |
| 1,785,339 | 12/1930 | Deland | 267—8 |
| 2,643,112 | 6/1953 | Smith | 267—64 |
| 2,726,773 | 12/1955 | Fitz John | 213—43 |
| 2,992,817 | 7/1961 | Templeton | 267—64 |
| 2,994,442 | 8/1961 | Frederick | 213—43 |
| 3,033,384 | 5/1962 | Zanow et al. | 213—43 |
| 3,035,827 | 5/1962 | Peterson | 267—34 |
| 3,128,885 | 4/1964 | Thompson et al. | 213—43 |

ARTHUR L. LA POINT, *Primary Examiner.*

LEO QUACKENBUSH, MILTON BUCHLER,
*Examiners.*